US007313295B2

(12) United States Patent
Ghandi et al.

(10) Patent No.: US 7,313,295 B2
(45) Date of Patent: Dec. 25, 2007

(54) METHOD AND APPARATUS FOR VARIABLE OPTICAL ATTENUATION FOR AN OPTICAL SWITCH

(75) Inventors: Kamyar Ghandi, Arlington, MA (US); Timothy S. Glenn, Somerville, MA (US)

(73) Assignee: Polatis Photonics, Inc., Billerica, MA (US)

( * ) Notice: Subject to any disclaimer, the term of this patent is extended or adjusted under 35 U.S.C. 154(b) by 38 days.

(21) Appl. No.: 11/063,453

(22) Filed: Feb. 23, 2005

(65) Prior Publication Data

US 2006/0188194 A1    Aug. 24, 2006

(51) Int. Cl.
*G02B 6/26* (2006.01)

(52) U.S. Cl. ............................. 385/16; 385/17; 385/18

(58) Field of Classification Search ............. 385/16–18
See application file for complete search history.

(56) References Cited

U.S. PATENT DOCUMENTS

| | | | |
|---|---|---|---|
| 4,303,302 A | 12/1981 | Ramsay et al. | |
| 4,657,339 A | 4/1987 | Fick | |
| 5,177,348 A | 1/1993 | Laor | |
| 5,450,508 A | 9/1995 | Decusatis et al. | |
| 5,727,099 A | 3/1998 | Harman | |
| 5,864,643 A * | 1/1999 | Pan | 385/22 |
| 6,137,941 A | 10/2000 | Robinson | |
| 6,222,954 B1 | 4/2001 | Riza | |
| 6,263,123 B1 | 7/2001 | Bishop et al. | |
| 6,345,134 B1 | 2/2002 | Laming et al. | |
| 6,411,751 B1 | 6/2002 | Giles et al. | |
| 6,484,114 B1 | 11/2002 | Dickson | |
| 6,556,285 B1 | 4/2003 | Dickson | |
| 6,711,340 B2 | 3/2004 | Dickson | |
| 6,738,539 B2 | 5/2004 | Hagood et al. | |
| 6,788,844 B2 | 9/2004 | Ng | |
| 6,975,785 B2 * | 12/2005 | Ghandi et al. | 385/16 |

(Continued)

FOREIGN PATENT DOCUMENTS

WO    WO 00/76106 A1    12/2000

(Continued)

OTHER PUBLICATIONS

Ford, J.E., et al., "Micromechanical Fiber-Optic Attenuator with 3 µs Response," *Journal of Lightwave Technology*, 16(9):1663-1670 (1998).

(Continued)

*Primary Examiner*—Jennifer Doan
(74) *Attorney, Agent, or Firm*—Hamilton, Brook, Smith & Reynolds, P.C.

(57) ABSTRACT

A controller in an optical switch providing optical coupling of an optical signal between a source port and a target port employs, in at least one axis, gradient control using a feedback loop that compensates for alignment error between a source port and a target port in an optical switch. In at least one other axis, the controller generates a control input according to a control law that results in variable attenuation of optical coupling between the source port and the target port in the optical switch. A dither signal may be applied to the control input in the at least one other axis. Amplitude of the applied dither signal may be varied.

31 Claims, 12 Drawing Sheets

U.S. PATENT DOCUMENTS

2003/0048984 A1     3/2003   Ng
2004/0081390 A1     4/2004   Bowers et al.

FOREIGN PATENT DOCUMENTS

WO     WO 02/01274 A2     1/2002
WO     WO 03/016958 A2     2/2003
WO     WO 03/016980 A1     2/2003

OTHER PUBLICATIONS

Datta, K. B. and Mohan, B. M., "Chapter 4: Analysis of Time-Delay Systems," pp. 127-129, and "Chapter 8: Optimal Control of Linear Systems," pp. 213-234, in *Orthogonal Functions in Systems and Control* (Singapore: World Scientific Publishing Co. Pte. Ltd.) (1995).

Patra, A. and Rao, G. P., "Continuous-time Model-based Self-tuning Control." In *General Hybrid Orthogonal Functions and their Applications in Systems and Control*, M. Thoma, ed. (London: Springer-Verlag London Limited), pp. 71-84 (1996).

Riza, N. A. and Sumriddetchkajorn, S., "Versatile multi-wavelength fiber-optic switch and attenuator structures using mirror manipulations," *Optics Communications*, 169:233-244 (1999).

Sumriddetchkajorn, S. and Riza, N. A., "Fault-tolerant three-port fiber-optic attenuator using small tilt micromirror device," *Optics Communications*, 205:77-86 (2002).

Ji, C., et al., "Electromagnetic Variable Optical Attenuator,"*IEEE/LEOS International Conference on Optical MEMs conference digest*, pp. 49-50 (2002).

Li, J., et al., "A Micromachined Variable Optical Attenuator (VOA)," *Proceedings of the SPIE—International Society for Optical Engineering*, 4582:112-120 (2001).

Endow, Y., "Optimal Control Via Fourier Series of Operational Matrix of Integration," *IEEE Transactions on Automatic Control*, 34(7):770-773 (1989).

Palanisamy, K. R., "Analysis and optimal control of linear systems via single term Walsh series approach," *Int. J. Systems Sci.*, 12(4):443-454 (1981).

Razzaghi, M., "Solution of Linear Two-point Boundary Value Problems via Fourier Series and Application to Optimal Control of Linear Systems," *Journal of the Franklin Institute*, 326(4):523-533 (1989).

Romulus, R., et al., "Automated Aerosol Testing," IEEE, 1993, p. 215-216.

\* cited by examiner

METHOD AND APPARATUS FOR VARIABLE OPTICAL ATTENUATION FOR AN OPTICAL SWITCH

BACKGROUND OF THE INVENTION

This invention relates to variable optical attenuation (VOA) in a free-space optical switch utilizing micro optical positioning or beam-steering devices.

Communication signals are now commonly transmitted across networks using optical fiber bundles that support substantial bandwidth. Fiber optic networks are composed of a large number of fiber optic lines that can carry many optical signals (e.g., Dense Wavelength Division Multiplexing (DWDM) signals) between nodes in the network. In many instances, optical signals arriving at a node are switched to selected output fibers after some conditioning. The connections between input and output fibers can be made by a variety of cross-connect switches, where any given optical signal on an input line can be switched to any output line at that node.

A typical, all-optical, free-space, cross-connect switch includes an array of optical emitters and an array of optical receivers. Each emitter (or source port) launches a collimated optical beam, which is then coupled into a selected receiver (or target port). collimated optical beam, which is then coupled into a selected receiver (or target port). The emitters can be selectively connected to the receivers by varying the direction of the emitted collimated beam so as to impinge on a selected receiver. In one approach, the emitters launch collimated beams in a fixed direction and use an array of moving micro-mirrors to redirect the beams towards the selected receivers. In an alternative approach, the emitters directly modify the direction of the collimated beam by, for example, tilting a lens or moving a fiber tip behind a lens. With either approach, the receiving port uses a similar mechanism to that of the source port to couple the collimated beam back into the optical fiber. Both types of optical switches can employ Micro-Electro-Mechanical Systems (MEMS) technology, with actuation provided by mechanical, electromagnetic, piezoelectric, photoactive ceramic or polymer, thermal, chemically-active polymer, electrostrictive, shape-memory alloy or ceramic, hydraulic and/or magnetostrictive actuators, or other types of actuators known in the art.

To achieve minimum loss of optical power across the switch, the source and target ports must be aligned accurately to ensure optimal coupling of the collimated beam into the target fiber. Even slight misalignments in either the source or the target will result in a significant loss of power through the connection and, potentially, degradation of the information encoded in the communication signal. Thus, a control system is typically used to correct misalignments actively in the system. Alternatively, it may be desired to attenuate the power coupled into the output fiber. Deliberate attenuation may be desired, for example, in order to equalize the power on multiple channels. Such equalization is often required for proper operation of Erbium Doped Fiber Amplifiers (EDFA). It may also be desired to attenuate power during various equipment tests or to accommodate devices which might be damaged by high power levels.

SUMMARY OF THE INVENTION

According to the principles of the present invention, during typical operation of a beam-steering optical switch, i.e., when maximum output power is desired, a closed-loop control system uses dither signals on each of four control axes to estimate the gradient of power with respect to the control inputs. The gradient information is then used to adjust the nominal components of the control inputs in order to maximize the output power. Using gradient information to control output power is referred to herein as "gradient control."

To provide variable optical attenuation, the control system can be used to attenuate the optical power at the output port through deliberate misalignment of the beam-steering elements along one or more control axes. For example, U.S. Publication No. 20040184708 discloses adjusting dither amplitude to attenuate output power. However, such an approach is susceptible to significant ripple of the output power caused by asymmetries in the optical power profile. An asymmetry in the optical power profile may be caused by numerous factors in the physical system, such as actuator nonlinearities or even optical aberrations.

The present invention provides a method for implementing a variable optical attenuator that is robust and minimizes ripple in the output power. To implement an attenuator that is both robust and produces low ripple, a number of different elements are incorporated into the control system.

For example, in one embodiment, a controller uses a method for controlling optical coupling between a source port and a target port in an optical switch. In at least one axis, the controller compensates for alignment error between the source port and the target port by using a feedback loop employing gradient control. In at least one other axis, the controller generates a control input according to a control law that results in variable attenuation of optical coupling between the source port and the target port in the optical switch.

In further embodiments, a control strategy is devised to maintain controller stability while also yielding low ripple on the output power signal during steady-state attenuated operation. In particular, this control strategy entails obeying certain threshold criteria for enabling and disabling the dither signal on the selected control axis or axes.

Measurement of the optical power may be performed at both the emitter and the receiver respectively, allowing for a differential measurement of the coupled power. By using the difference in power measured at the source and the target ports, the presented algorithm(s) can alternatively be used to control the amount of relative attenuation instead of the amount of absolute power coupled to the output.

While the invention is described in the context of an optical switch with multiple input ports and multiple output ports, it also applies to devices containing any number of emitters and receivers and, in particular, to devices containing only one emitter and one receiver. Such a device could be used as a dedicated attenuator without providing any switching functionality.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Plant Description

Figure 1:
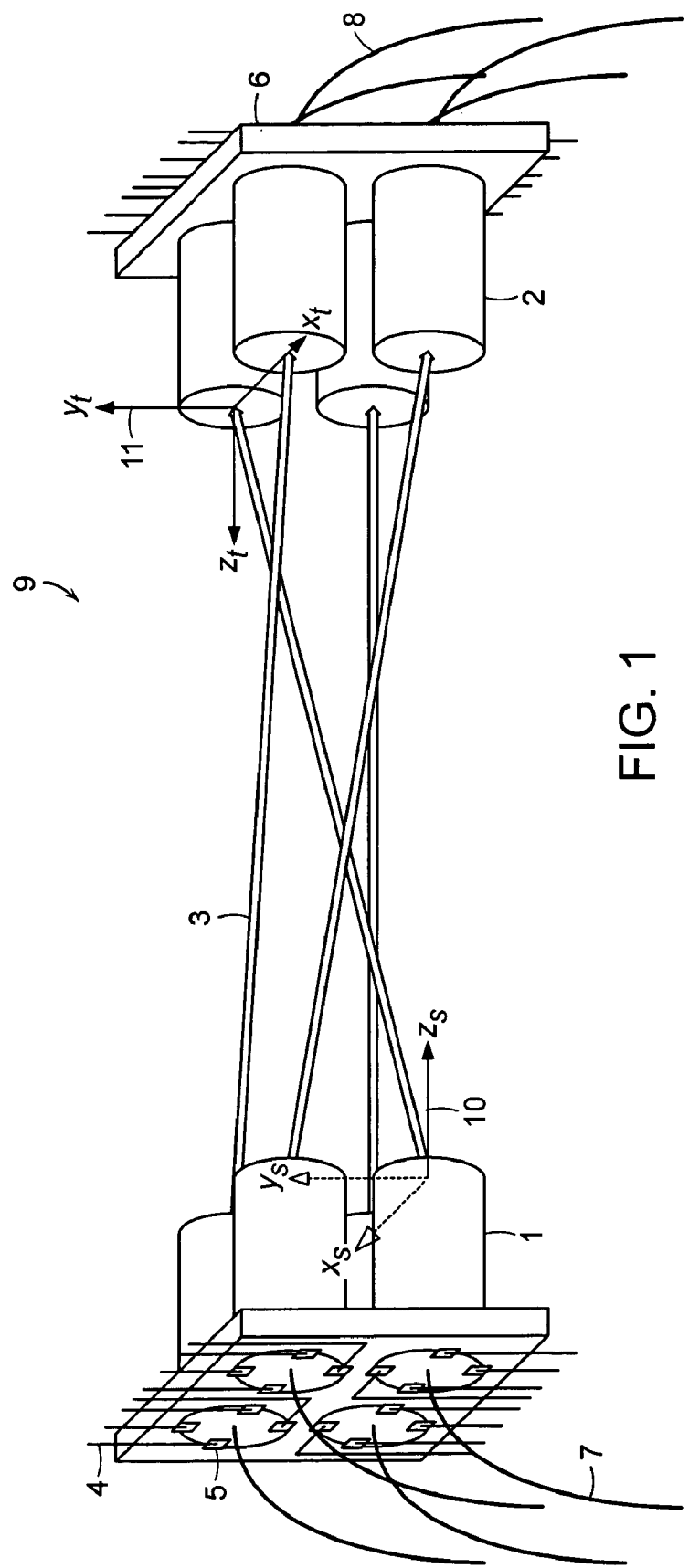
FIG. 1 is schematic diagram of one embodiment of a free-space, beam-steering, optical switch.

FIG. 1 details a typical, all-optical, free-space, cross-connect switch comprising an optical fabric 9 that includes optical source port emitters 1 and optical target port receivers 2. The emitters 1 can be selectively connected to the receivers 2 by varying the direction of the collimated beam 3 so as to impinge on the selected receiver 2. This can be accomplished by directly controlling the horizontal and/or vertical tilt angle of one of the emitters 1 or receivers 2. In other embodiments, mechanical actuators may control the horizontal or vertical direction of one or more micro-mirrors that control the resulting beam 3 or its detection. Any combination of active and/or passive emitters and/or receivers can be combined to form 1×N, N×1, N×N or M×N switch assemblies. It should also be understood that the assembly is bi-directional, i.e., input ports 1 can be considered to be output ports 2 and vice versa. FIG. 1 also shows a typical placement of the electrical control leads 4, electrical contacts 5, and support hardware 6.

Figure 2:
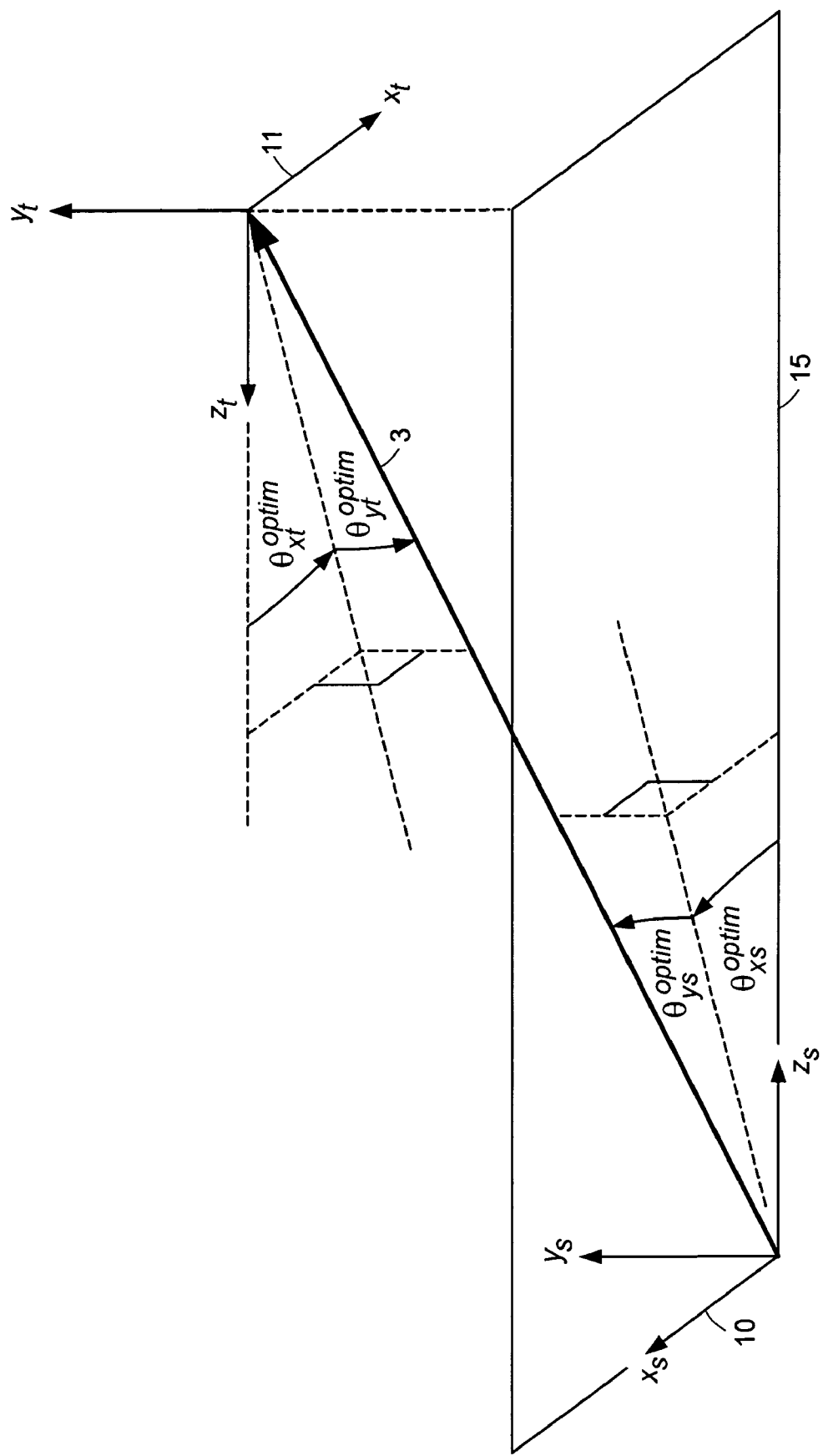
FIG. 2 is a plot of the three-dimensional coordinate axes describing optimal alignment of source and target ports for maximum output optical power.
Figure 3:
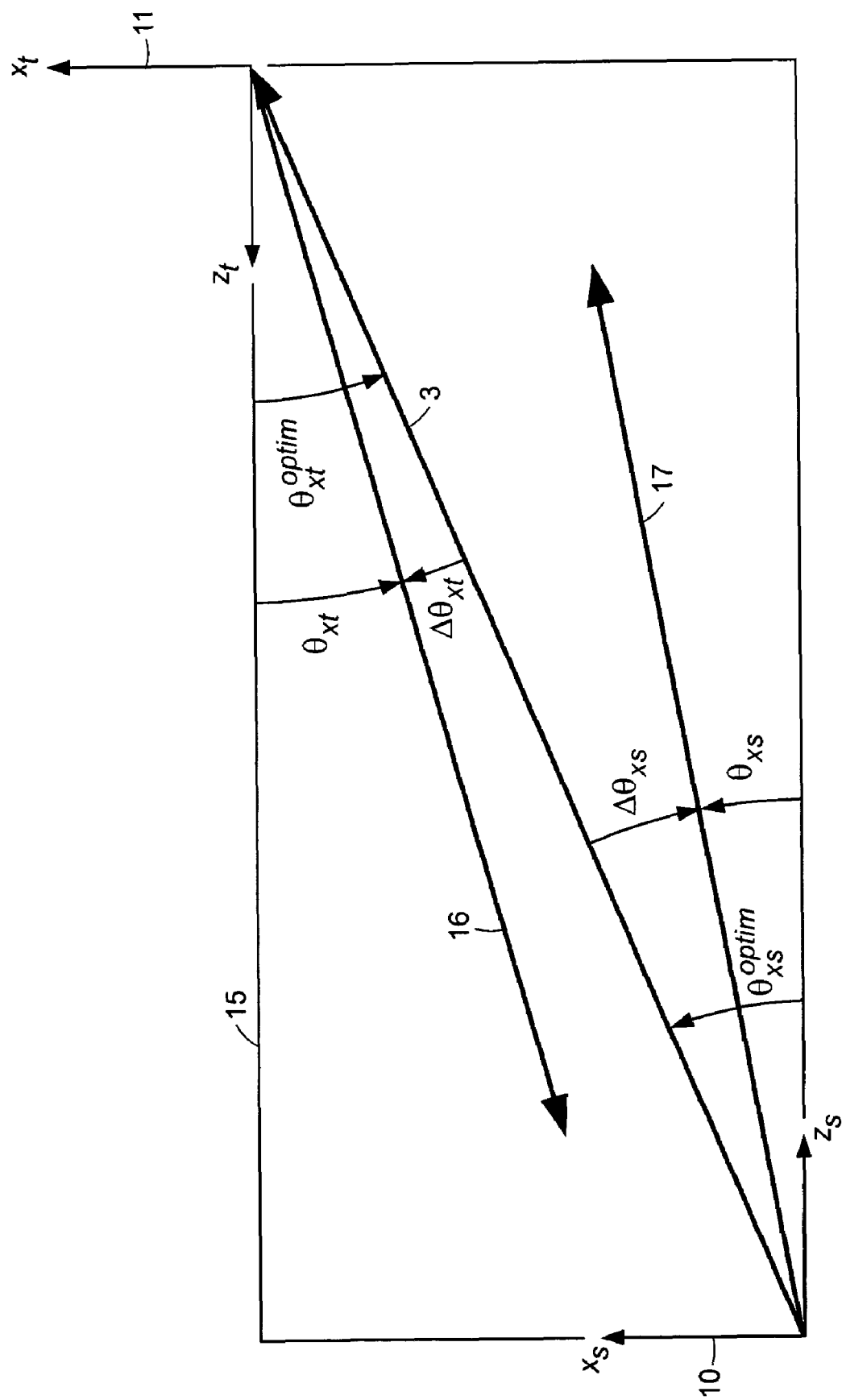
FIG. 3 is a two-dimensional projection onto the x-z plane comparing misalignment of source and target ports with the optimal alignment direction.

The basic function of the optical switch is to couple light from the input fibers 7 connected to the source ports and the output fibers 8 connected to the target ports. A pair of coordinate systems 10 and 11 define the connections between the source and target ports, respectively, used in FIGS. 2 and 3. FIG. 2 represents the three-dimensional (3-D) coordinate systems used to define the optimal alignment angles between the source and target ports while FIG. 3 is the projection of FIG. 2 on the x-y plane and is used to define angular alignment errors as more fully detailed below. The resulting vector 16 represents a deviation from the optimal pointing angle of the target 2, and vector 17 represents the deviation form the optimal pointing angle of the source 1.

The source and target ports change the beam pointing angles (or virtual beam pointing angles for the target port) in response to control inputs. The optical power coupled from the source to target port is at least partially dependent on the beam angles and, therefore, is a function of the control inputs. The angles of the optical beam produced by the source port are denoted by $\theta_{xs}$ and $\theta_{ys}$, and the angles of the virtual beam received by the target port are denoted by $\theta_{xt}$ and $\theta_{yt}$. In general, each port is a dynamic nonlinear system. Thus, the beam angles can be related to the control inputs through a general relation of the form $$\theta(t) = \begin{bmatrix} \theta_{xs} \\ \theta_{ys} \\ \theta_{xt} \\ \theta_{yt} \end{bmatrix} = L(u(t), \alpha, t), \tag{1}$$

where u is the vector form of control inputs, $\alpha$ is a vector of system parameters, t is time, and L represents a nonlinear, potentially time-varying dynamic operator representing the dynamic mapping of function u(t) to $\theta(t)$.

The control inputs consist of slowly varying nominal control inputs, $\bar{u}$, and smaller perturbations, $\delta u$, also referred to as dither signals, as in $$u = \begin{bmatrix} u_1 \\ u_2 \\ u_3 \\ u_4 \end{bmatrix} = \bar{u} + \delta u. \tag{2}$$

In this example, the four control inputs $u_1$ through $U_4$ may be thought of as mapping directly to control of the four beam angles, but this is not necessary. In general, fewer or more than four control inputs may apply, and almost certainly, cross coupling between control inputs and beam angles may exist.

Optical Power

Insertion loss of the switch is in part a function of the angular pointing errors of the source and target ports. In general, the insertion loss of the switch is a function of many optical parameters in the system, such as splice accuracy, optical element coating behaviors, the transmissive properties of any interspersed media between the ports, and so forth. For the purposes of exposition here, only the dependency of power on beam angles is considered. This should not be taken as limiting but only clarifying for the discussion.

FIGS. 2 and 3 illustrate the coordinate systems necessary to define angular pointing errors. In FIG. 2, the optimal beam path 3 is shown connecting the origins of the Cartesian coordinate systems 10 and 11 of the source port 1 and target port 2, respectively. The beam angles of this optimal path are defined relative to the coordinate systems by of $\theta_{xs}^{optim}$ and $\theta_{ys}^{optim}$ for the source port 1 and $\theta_{xt}^{optim}$ and $\theta_{yt}^{optim}$ for the target port 2.

To better illustrate the actual beam angles and their angular pointing errors due to misalignment relative to the optimal beam path, FIG. 3 depicts a planar projection of the coordinate systems onto the x-z plane 15. Though not shown, angles in the y-z plane are analogous to those shown in FIG. 3. Again, relative to the coordinate systems 10 and 11, the beam angles for the actual beam path 17 of the source port 1 are given by $\theta_{xs}$ and $\theta_{ys}$, and the beam angles for the virtual beam path 16 of the target port 2 are given by $\theta_{xt}$ and $\theta_{yt}$. The angular pointing errors, $\Delta\theta_{xs}$, $\Delta\theta_{ys}$, $\Delta\theta_{xt}$, and $\Delta\theta_{yt}$, are defined as the deviations of the source beam angles and the target beam angles from the optimal values according to $$\Delta\theta = \theta - \theta^{optim}. \quad (3)$$

Naturally, optical power coupling is maximized when the actual and virtual beam paths are coincident with the optimal beam path, i.e. when all $\Delta\theta=0$. However, when alignment errors do exist, the insertion loss power relationship can be represented roughly by a Gaussian of the form $$P(t) = P_0 \cdot 10^{-a166\,\theta_{xs}^2 - a2\Delta\theta_{ys}^2 - a3\Delta\theta_{yt}^2}. \quad (4)$$

The coefficients $a_1$ through $a_4$ represent the sensitivity of the insertion loss to pointing errors in the different directions and are typically approximately equal.

In general, since the optical power is a nonlinear function of the beam angles, and because the beam angles are themselves nonlinear functions of the control inputs, the following equation applies:

$$P(t) = H(u(t), a, t), \quad (5)$$

where P(t) is, in the most narrow sense, the optical power coupled into the output waveguide associated with a given target port. For the purposes of the rest of this description, P(t) generally represents a signal which is some function of the actual power; for instance, P(t) may be algebraically related to the optical power in the output fiber. The optical power signal, P(t), may also represent optical power measured in decibels, equivalent to taking the logarithm of Eq. (5) and scaling by ten. The optical power signal, P(t), may also represent a constant gain times the actual power. The optical power signal, P(t), may also be taken as the difference between the input power in the waveguide associated with the source port 1 and the output power in the waveguide associated with the target port 2. This can be the case when an optional input optical power detector is included in the system along with the output detector present in the sensor tap. This configuration of the system is advantageous because the absolute power loss through the optical switch can be measured directly by subtracting the source and target powers. Although P(t) is referred to herein as the power signal, it is, in more general terms, a signal related to the optical power coupled from source to target.

As part of the physical hardware, an optical power sensor output can be obtained by detecting a small portion of the optical communications signal on a receiving end or target location and feeding it to an optical intensity sensor. This provides a direct measure of the optical beam power to be used for system control. Optionally, instead of measuring the optical communications signal, a reference optical signal can be coupled to the input side of the device and measured using a wavelength-selective tap coupled to the target. Still further, measuring the optical communications signal and reference optical signal may be done at both the receiving side and input side, respectively, allowing for a direct differential measurement.

Attenuation Control

During closed-loop control, correlation of the power signal to the dither inputs is used to calculate the gradient of power with respect to the control inputs. The details of this process have been described in U.S. Publication No. 20040184708, the entire teachings of which are incorporated herein by reference.

For example, if the dither signal applied to the selected control input is $\delta u_1 = d_1 \sin(\omega_1 t)$, then the power signal, P(t), contains a nominal component, $\overline{P}$, a dither component, $\delta P_1$, that is roughly proportional to the said dither signal, and components roughly proportional to the dither signals on other control inputs. The nominal power can be computed from the power signal by using a filter, for example $$\frac{1}{T}\int_T P(t)\,dt \cong \overline{P}, \quad (6)$$

where T is an appropriate period selected based on the temporal frequencies of the dither signals of all control inputs. The gradient of power with respect to the selected control input can be estimated using $$\left(\frac{2}{Td_1}\right)\int_T P(t)\sin(\omega_1 t)\,dt \cong \frac{\partial P_1}{\partial u_1}. \quad (7)$$

To maximize the output power, the gradient information can be used to implement a closed-loop controller. For example, a gradient ascent algorithm can be implemented by setting the nominal control input on each axis proportional to the integral of the computed gradient. This is achieved by $$\dot{\overline{u}_i} = k_g \frac{\partial P}{\partial u_i}, \text{ where } k_g > 0, i = 1 \ldots 4. \quad (8)$$

Here, $k_g$ is the controller gain for the gradient ascent law. Other filters can be included to limit the rate, provide smooth transitions, and so forth, as described in U.S. application Ser. No. 10/392,371.

According to one aspect of the invention, in order to attenuate optical power, a different control algorithm is used on at least one of the control axes. To attenuate power, the algorithm computes the error, e, between the measured nominal power signal, $\overline{P}$, and the desired power level, $P_{cmd}$, according to $$e = P_{cmd} - \overline{P}. \quad (9)$$

A servo control law can then be used to adjust the nominal control input, $\overline{u}_1$, so as to reduce the error to zero, for example $$\dot{\overline{u}}_1 = k_s e, \text{ where } k_s > 0. \quad (10)$$

Here, $k_s$ is the controller gain for the servo control law.

For clarity, it is assumed that the attenuation algorithm is applied along the control axis associated with the first control input, $u_1$; however, the method can be generalized to any axis or any combination of axes.

Figure 4:
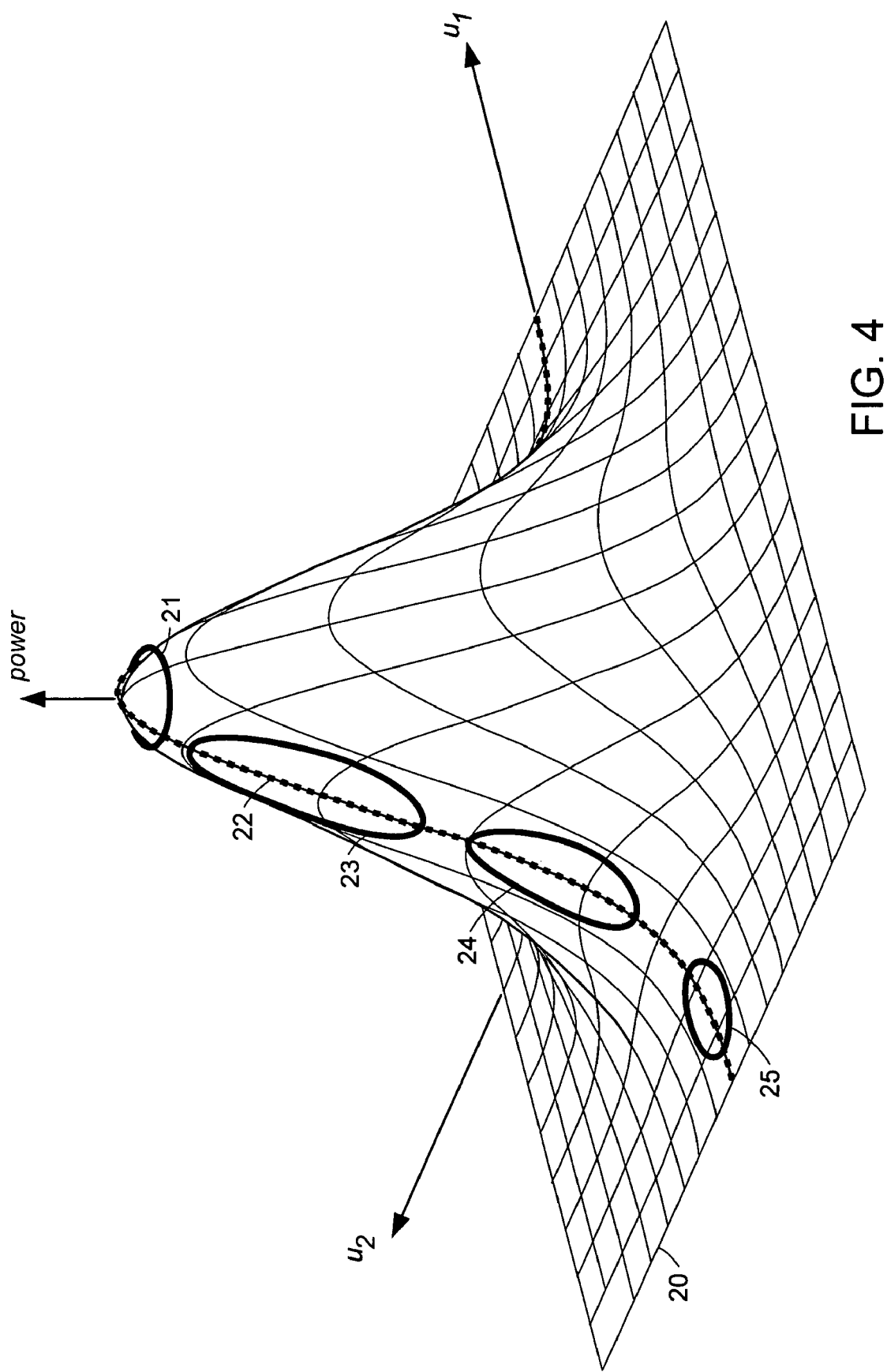
FIG. 4 is a plot of optical power level as a function of two of the control inputs, and sample paths of the system during Variable Optical Attenuation (VOA) operation.

With reference to FIG. 4, the output optical power 20 is depicted as a function of two of the control variables, specifically $u_1$ and $u_2$. Elliptical trajectory 21 represents the path of the system produced by the dither signals when the system is at maximum output power. While for simplicity maximum power is depicted as occurring at the origin of the coordinate system, this is generally not the case, and is not required for the operation of the system controller. The servo law adjusts the nominal control input along axis $u_1$ such that the nominal power is reduced relative to the peak power.

Figure 6:
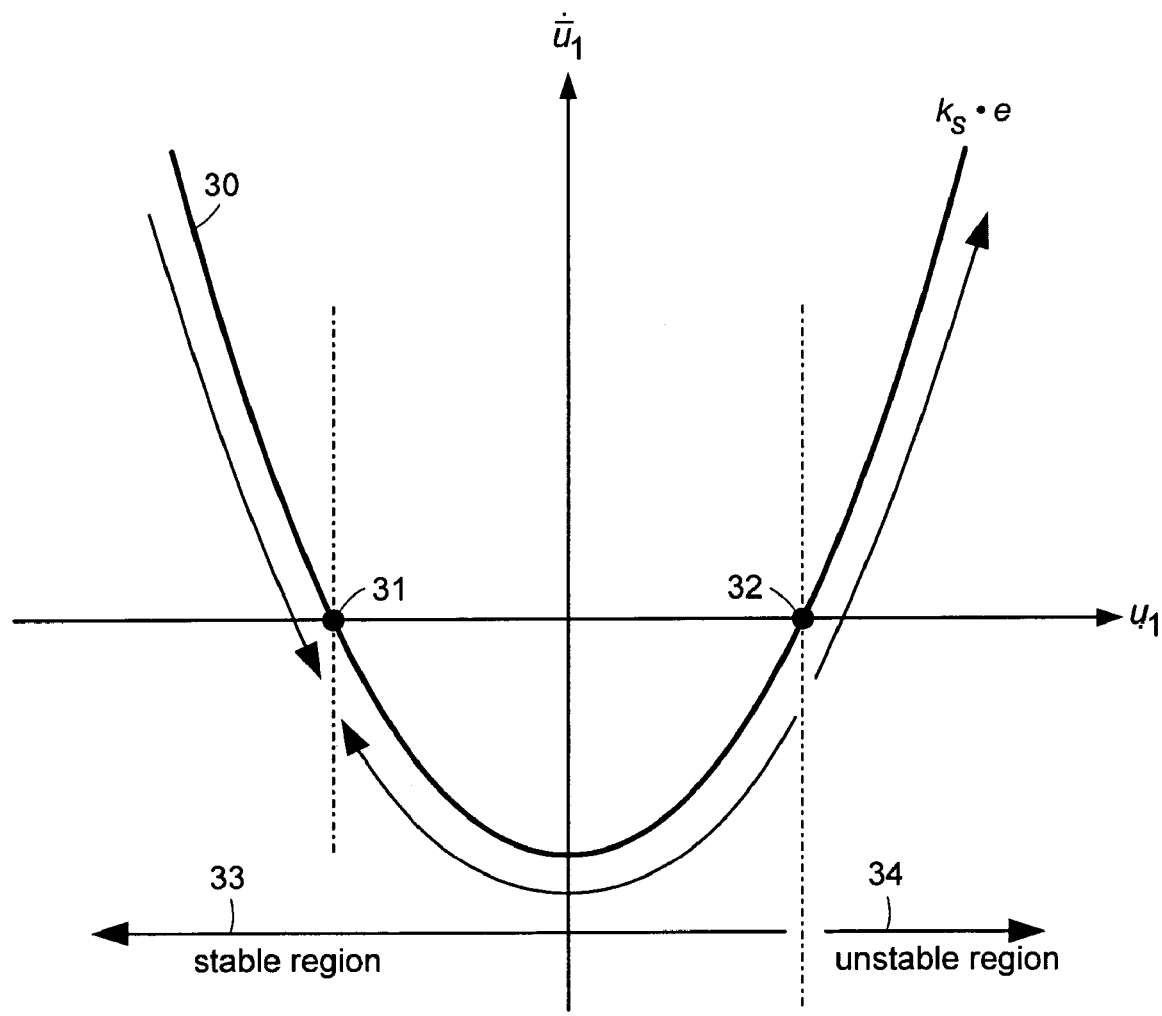
FIG. 6 is a plot of the control law, demonstrating operation of a servo control law.

With reference to FIG. 6, which is a plot of equation 10 above, the error 30 between the measured nominal power, $\overline{P}$, and the desired power level, $P_{cmd}$, is shown as a function of the control input $u_1$ for the case where $P_{cmd}$ is less than the maximum achievable output power, $P_0$. It is noted that two solution points, 31 and 32, exist where the error is zero.

When the desired power level, $P_{cmd}$, is higher than the measured nominal power, $\overline{P}$, the error is negative. Thus, the servo law reduces the nominal control input, $\overline{u}_1$, until the system reaches point 31. When $P_{cmd}$ is lower than $\overline{P}$, the error is positive, and the controller increases the nominal control input. Thus, if the system is in region 33 to the left of point 32, the controller is stable and converges to the solution point 31. However, when the system is in region 34 to the right of point 32, the controller is unstable, and the servo law causes the system to diverge without bound from the desired power level. The remedy for avoiding this instability is described below.

Figure 7:
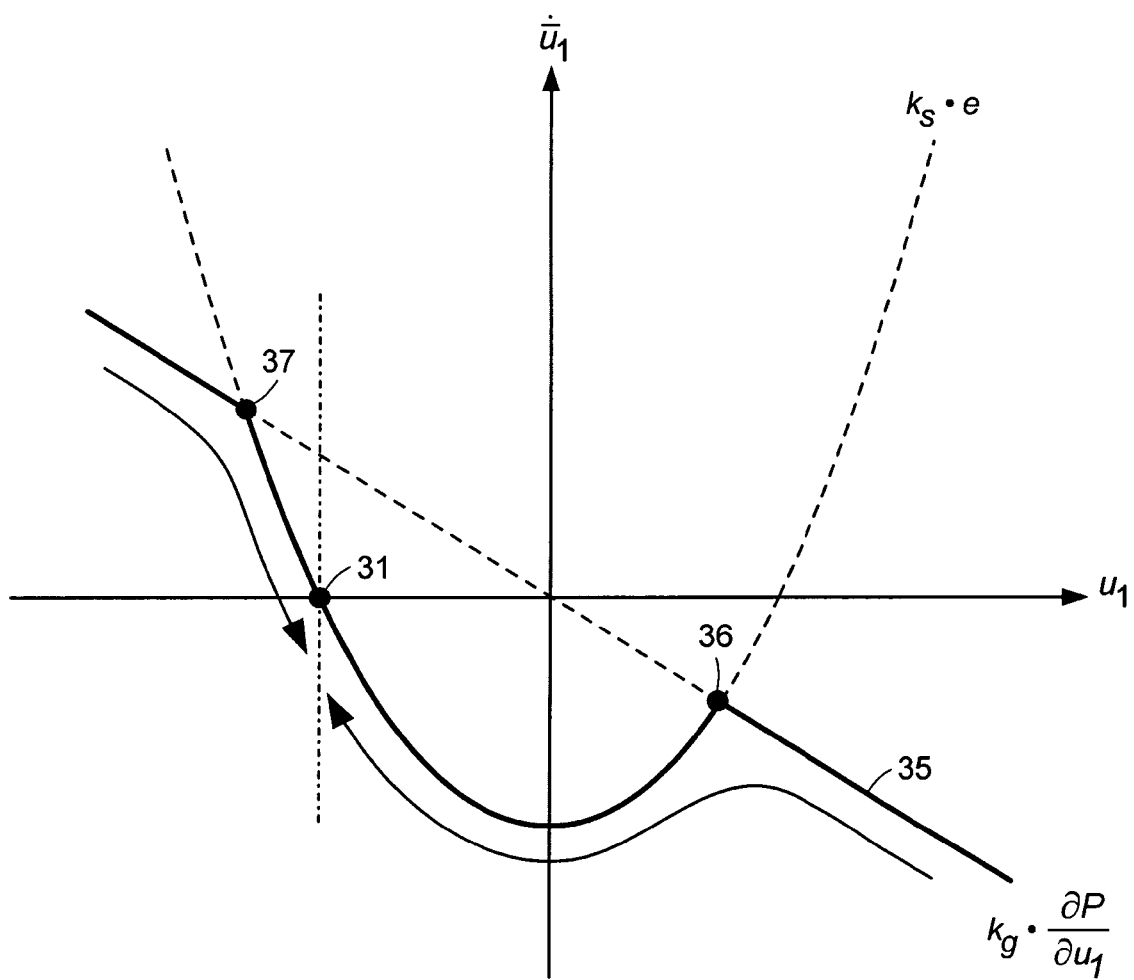
FIG. 7 is a plot of the control law, demonstrating combined operation of a servo control law and gradient ascent law.

To prevent the controller from becoming unstable, optical power gradient information can be used. As described earlier, a dither signal is added to the nominal control input and is used to estimate the gradient of optical power with respect to the control input. With reference to FIG. 7, which is a plot of a minimum value, optionally scaled, of either equation 8 or equation 10, according to another aspect of the invention, the servo control law and the gradient ascent law are combined to overcome the instability in the servo controller. At any given instant, $\overline{u}_1$ is computed according to both algorithms. The smaller of the two quantities 35 is then used to actually update the nominal control input. It can be seen that when the system is to the left of point 31, the nominal control input is increased. When the system is to the right of point 31, the nominal control input is decreased. Thus, the combined controller is always stable and converges on point 31. In other words, error between the nominal power level and the desired power level is always reduced to zero, achieving the desired attenuation.

Figure 5:
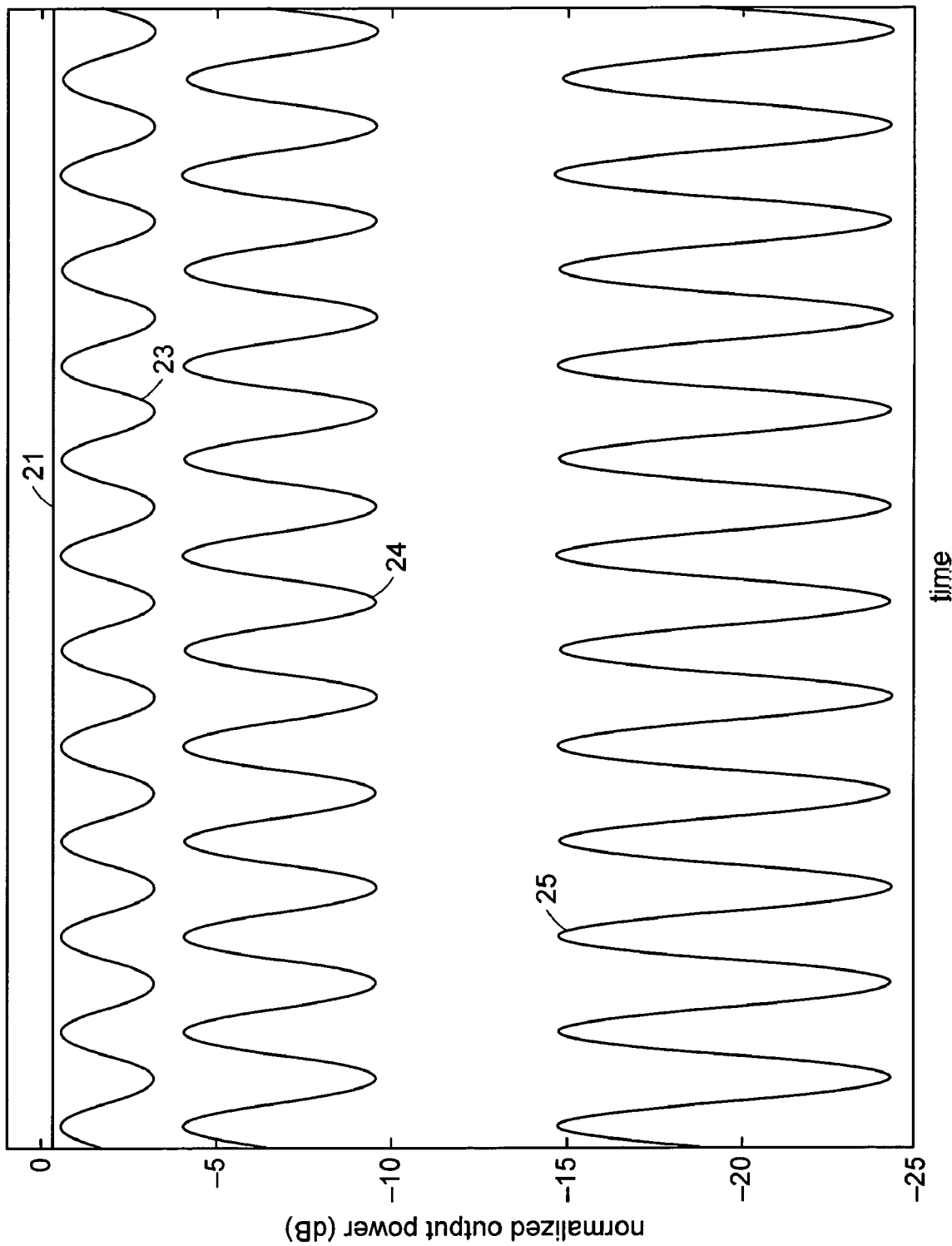
FIG. 5 is a plot of the optical power during VOA, demonstrating ripple caused by a dither signal applied to a control input corresponding to a first axis.

With reference to FIGS. 4 and 5, it can be seen that when the optical power is attenuated by offsetting the nominal control input, $\overline{u}_1$, the sensitivity to perturbations in the direction of axis 1 is significantly increased. Thus, the dither signal on axis 1 causes unacceptably large ripple 23-25 on the output power.

Figure 8:
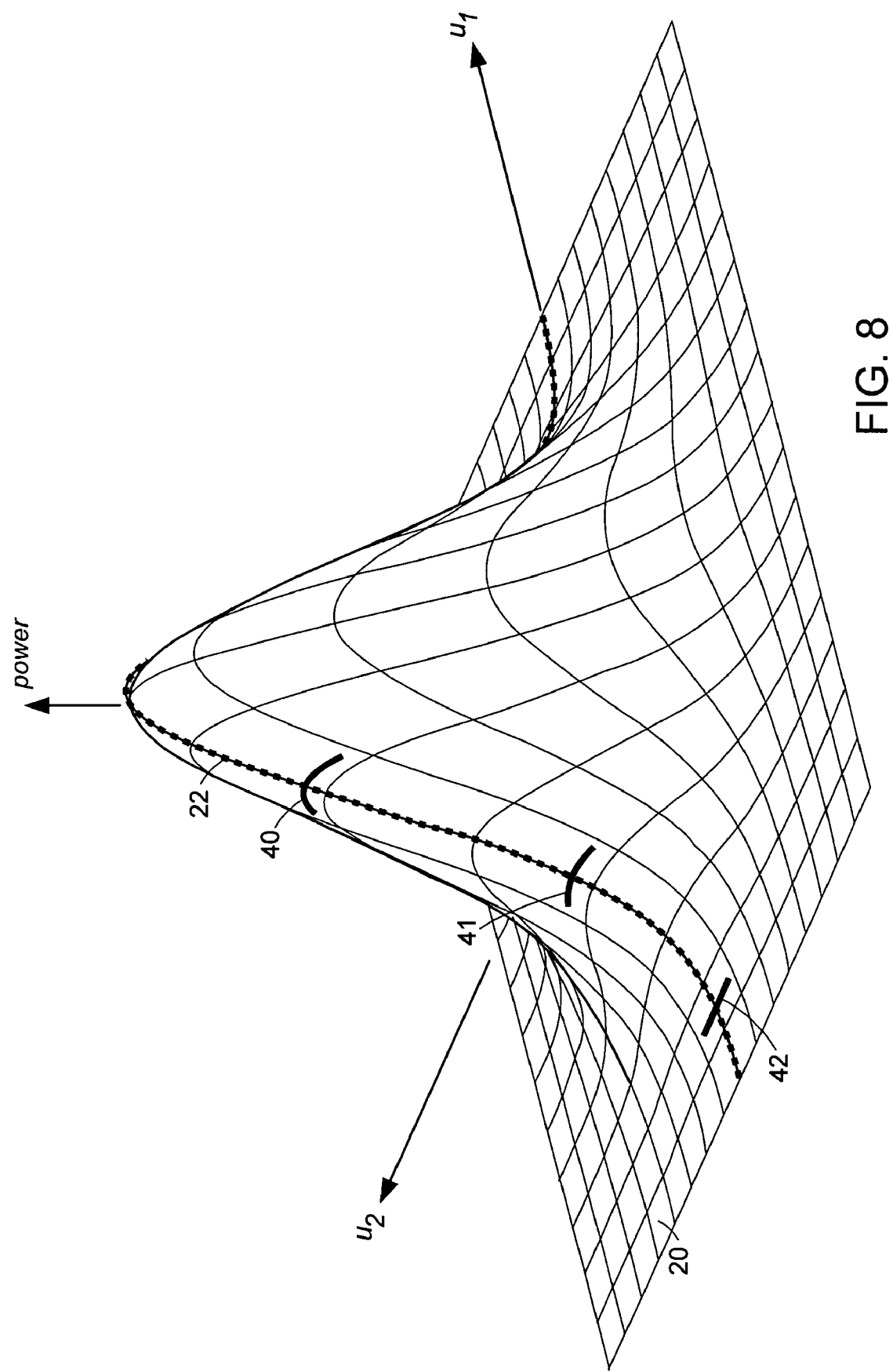
FIG. 8 is a plot of optical power as a function of two control inputs and sample paths of the system during VOA operation while dither applied to a control input corresponding to the first axis is turned off.
Figure 9:
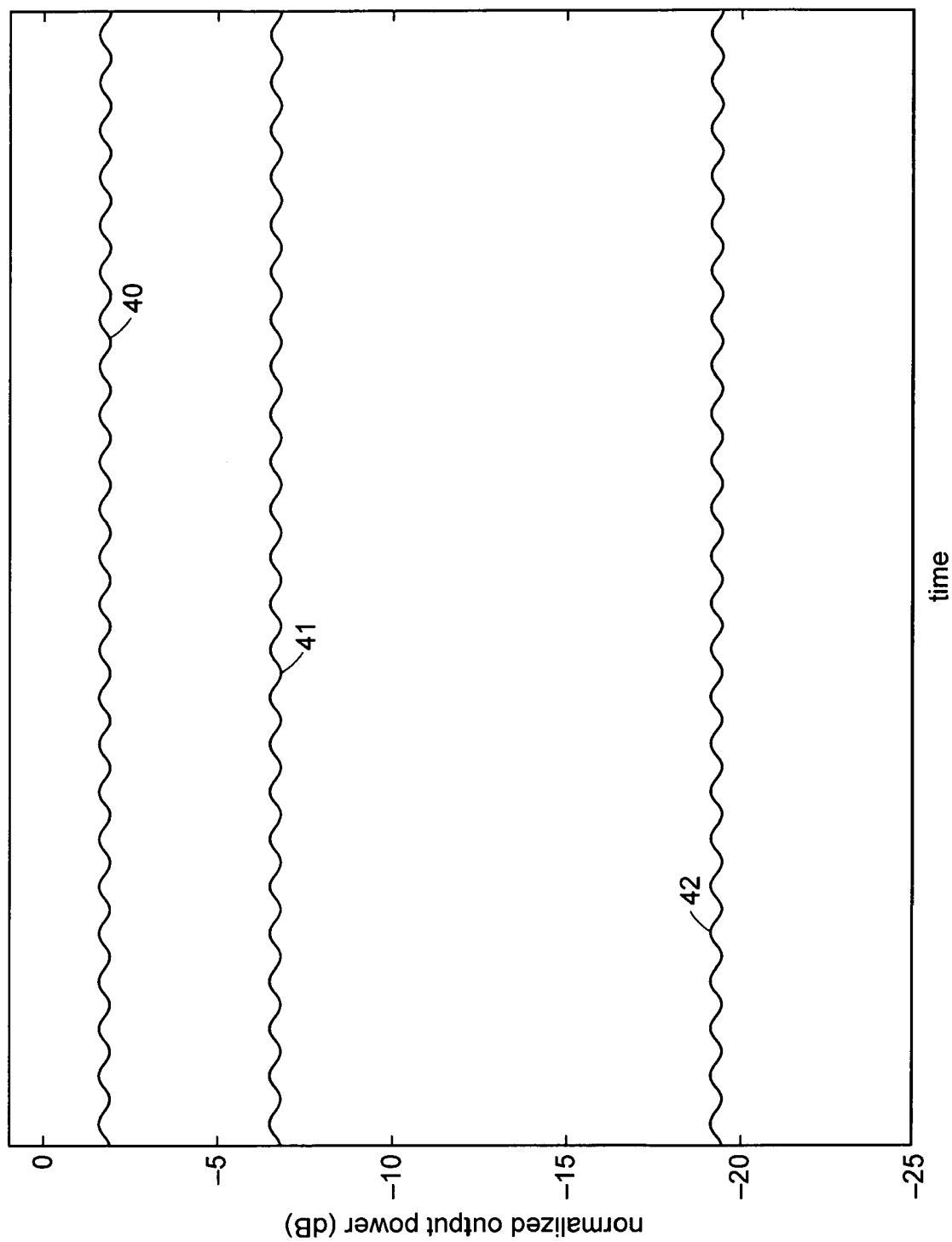
FIG. 9 is a plot of the optical power during VOA, demonstrating reduced ripple by turning off dither signal on the control input corresponding to the first axis.

According to another aspect of the invention, the dither signal on the control axis used for attenuating optical power is shut off when the gradient information for that axis is not needed by the controller. With reference to FIGS. 8 and 9, it can be seen that this significantly reduces the ripple 40-42 on the output power. Note that only the dither on the axis used for attenuation is shut off. The other control inputs may continue to employ a dither signal.

The controller may, thus, operate in different modes. In a first mode of operation, a dither signal is applied to each control input, including the input or inputs selected for attenuation control. This mode guarantees controller stability. In a second mode of operation, the dither signal is removed from the selected control input or inputs. This mode eliminates unwanted ripple from the output power. Selecting the criteria for transitioning between the two modes is now discussed.

With reference to FIGS. 6 and 7, various criteria may be proposed. It should be remembered, however, that a number of aspects of the control law relationships change depending on the physical system and on the desired power level. For example, as mentioned earlier, the absolute value of $u_1$ at which maximum power is achieved is not necessarily known. Similarly, the values of $u_1$ at which the critical points 31, 32, 36, and 37 occur depend on a number of factors that cannot be established a priori. Therefore, the criteria for turning dither on and off should be based solely on available information. When dither is on, the available information includes measured nominal power, the desired power level, the error metric, the gradient estimates on all axes (i.e., including the axis with control input $u_1$), and any derived quantities. When dither is off, the available information includes measured nominal power, the desired power level, the error metric, the gradient estimates on the other axes (i.e., all axes except the axis or axes without dither), and any derived quantities. Furthermore, a hysteresis condition might be imposed to prevent unnecessary transitions between the dither on and dither off modes of operation.

Figure 10:
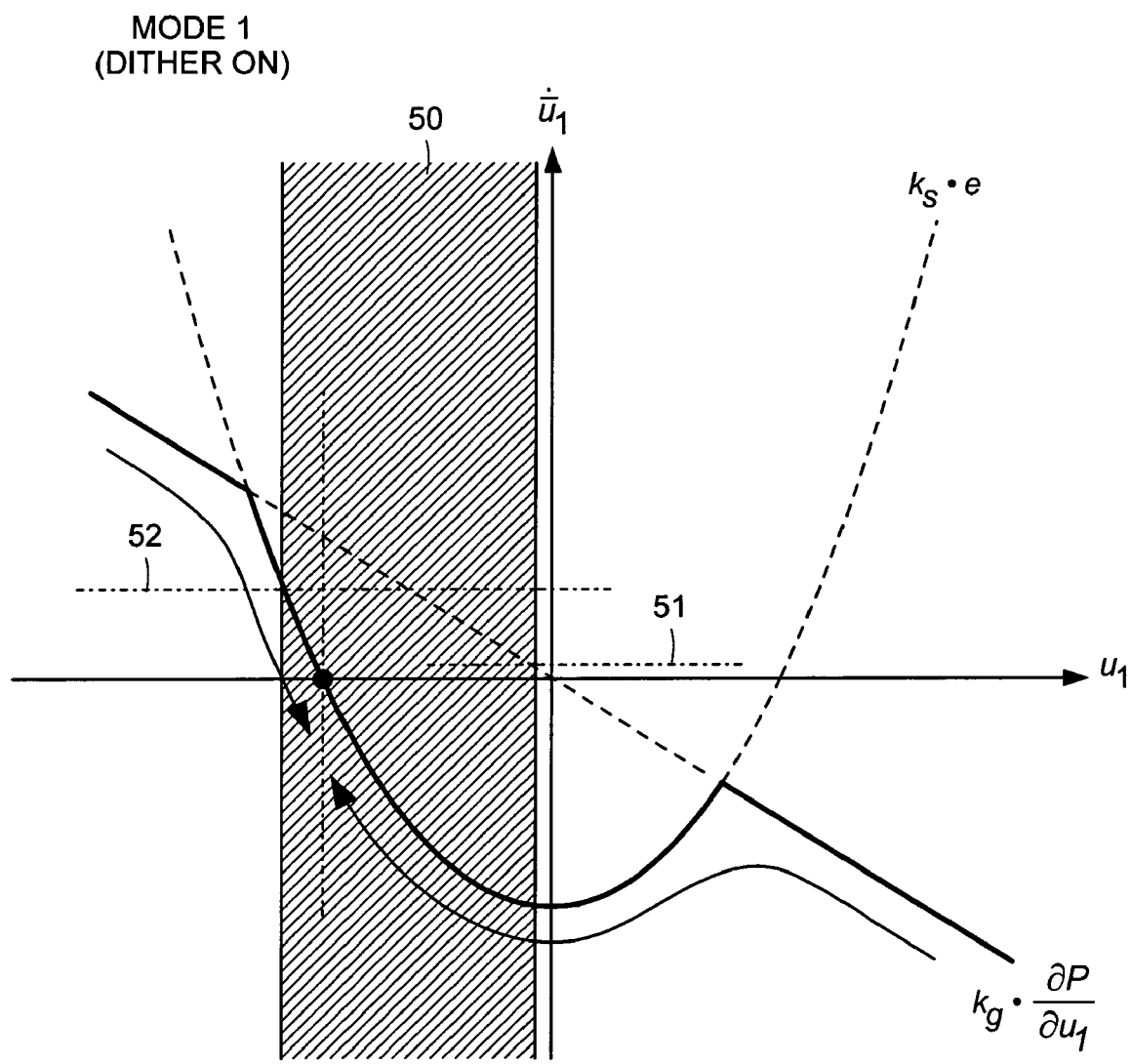
FIG. 10 is a plot of the control law, demonstrating both operation of the controller while the dither is on and also the criteria used for turning off the dither.
Figure 11:
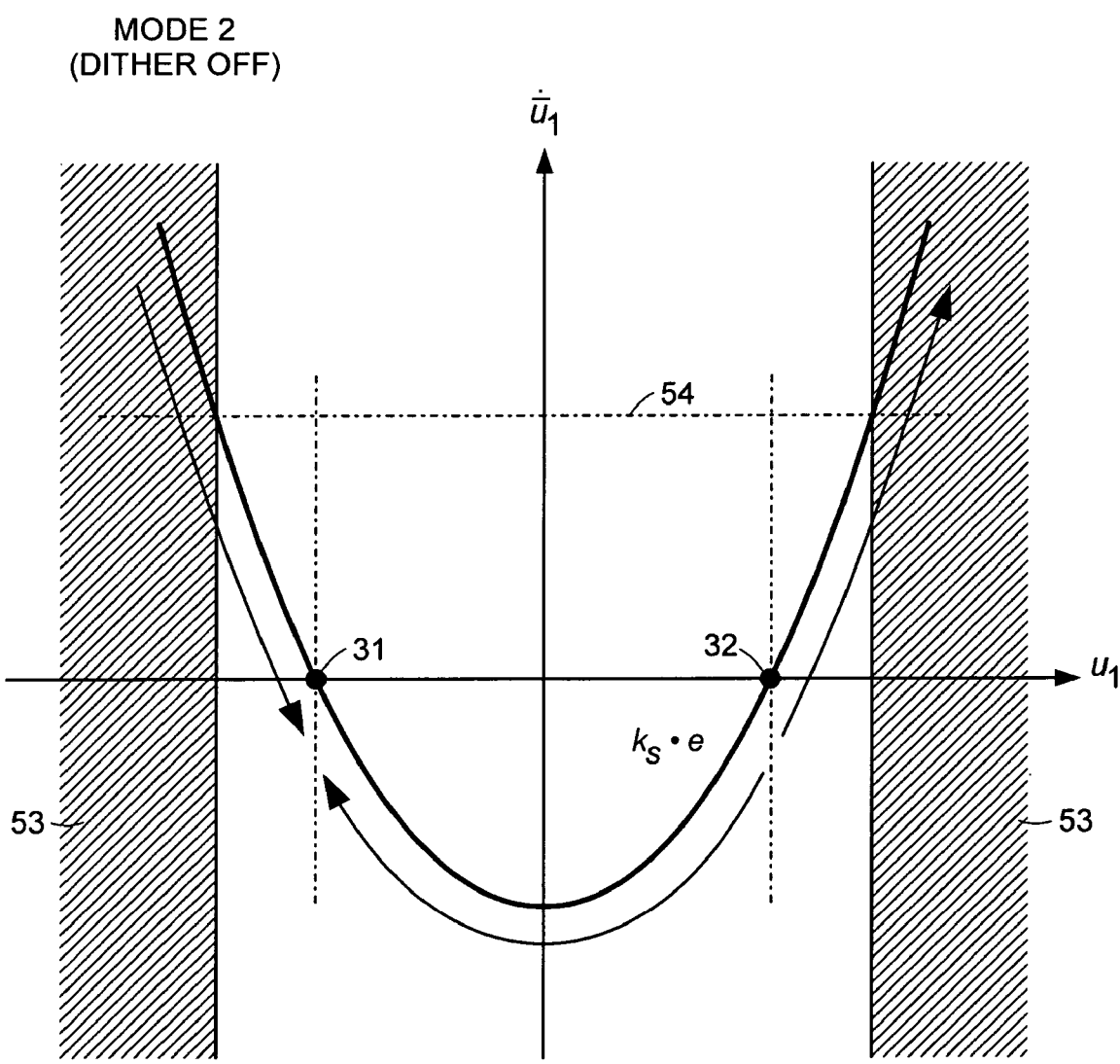
FIG. 11 is a plot of the control law, demonstrating both operation of the controller while the dither is off and also the criteria used for turning on the dither.

According to one embodiment, the criteria for transition are based on a combination of the error metric and the power gradient. For example, with reference to FIG. 10, when the dither is on, and the system enters specified region 50, dither is preferably turned off. Region 50 can be defined in terms of the available quantities by the criterion $$k_g \frac{\partial P}{\partial u_1} > T_1 \text{ AND } k_s e < T_2, \tag{11}$$

where $T_1$ 51 and $T_2$ 52 are selectable thresholds. With reference to FIG. 11, when the dither is off, and the system enters specified region 53, dither is preferably turned on. Region 53 can be defined by using the criterion $$k_s e > T_3, \tag{12}$$

where $T_3$ 54 is a selectable threshold. When neither criterion is satisfied, the system continues to operate in the previous mode of operation.

The thresholds $T_1$, $T_2$, and $T_3$ are preferably selected to ensure robustness of the system controller, minimize ripple on the output power, and prevent unnecessary transitions between the different modes of operation. For example, $T_1$ should be chosen positive for guaranteed avoidance of critical point 36 yet small enough to ensure the earliest transition to the dither-off mode. $T_2$ should be chosen positive to ensure that dither is turned off when converging upon stable solution 31, i.e. when the desired output power is reached. Lastly, $T_3$ should be chosen greater than $T_2$ to prevent unnecessary mode transitions.

Figure 12:
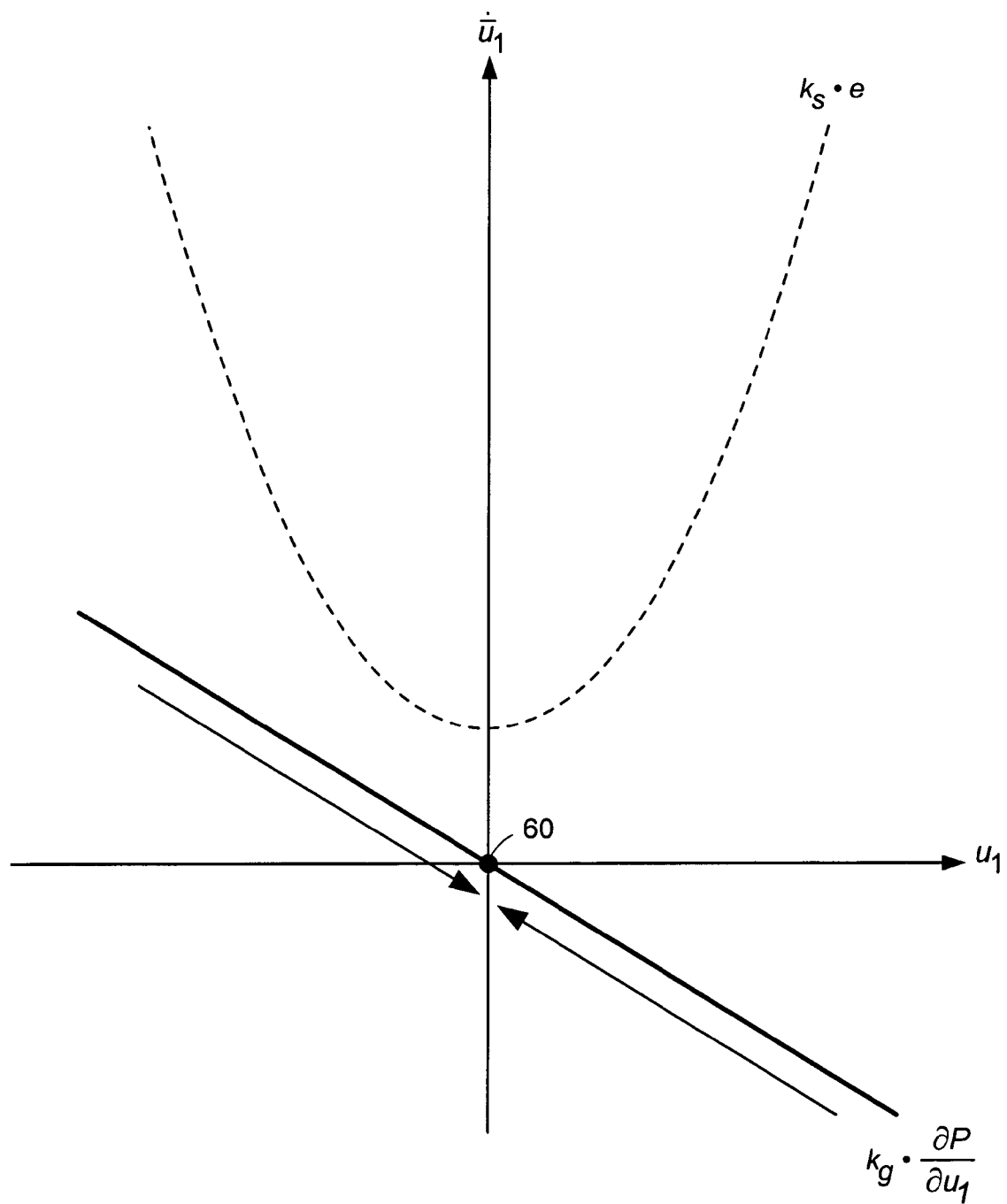
FIG. 12 is a plot of control effort, demonstrating operation of the controller when the desired optical power is greater than the maximum achievable optical power.

As a result of the above considerations, the control system performs as desired under possibly degenerate conditions. For example, with reference to FIG. 12, it may be the case that a desired output power, $P_{cmd}$, is specified that is greater than the maximum achievable power level, $P_0$. In such a case, e is always greater than zero, and no solution exists that can satisfy the servo criteria. The servo control law thus increases the control input $u_1$ without bound. However, upon entering region 53, the system transitions to the dither-on mode of operation. The gradient ascent law then changes $u_1$ until the gradient is zero, i.e. at stable point 60. Thus, the system converges upon the maximum achievable output power, the same condition at which the error between the desired power and the nominal power is minimized.

It should be understood that while the servo and gradient ascent control laws represent a simple embodiment of the invention, additional enhancements can be added. These enhancements include, for example, use of proportionalintegral-differential (PID) controllers, rate limits, saturation limits, anti-windup techniques, or other approaches known in the art. Also, when gradient information is not needed along the selected control axis, the dither amplitude on that axis may be reduced in lieu of removing the dither signal. Varying dither amplitude can provide for smoother transition between modes of operation than can instantaneous removal of the dither signal.

Depending on the configuration of optical sensors within the system, it should also be understood that two distinct manners of attenuation can be employed via the algorithm described in the current invention. In the first manner of attenuation, where the optical power signal, P(t), represents the optical power coupled into the output waveguide associated with a given target port, closed-loop control to an absolute output level, $P_{cmd}$, can be employed. Alternatively, where input sensors or other knowledge of the actual input power are available, P(t) may be taken as the difference between the input power in the waveguide associated with the source port and the output power in the waveguide associated with the target port. In this manner, closed-loop control to a relative output level, $P_{cmd}$, may be employed. The former manner of attenuation is referred to herein as absolute VOA, and the latter is referred to herein as relative VOA. Though distinct from each other with regard to apparent system behavior, the two manners of attenuation are identical with regard to implementation of the algorithm.

In summary, the principles of the present invention include a particular implementation of variable optical attenuation that not only guarantees stability of the system controller but also minimizes ripple in the optical power signal.

While this invention has been particularly shown and described with references to preferred embodiments thereof, it will be understood by those skilled in the art that various changes in form and details may be made therein without departing from the scope of the invention encompassed by the appended claims.

For example, a single controller providing multiple-input, multiple-output (MIMO) control may be used to control the four axes of the source port 1, target port 2, or both. In another embodiment, multiple controllers may be used to control the axes of the ports 1 and 2.

For optical switches configured with controllers that use non-rectangular coordinates (e.g., cylindrical or spherical coordinates), the controller(s) can be used with control laws adapted for use in such other coordinate systems.

What is claimed is:

1. A method for controlling optical coupling between a source port and a target port in an optical switch, the method comprising:
   in at least one axis, compensating for alignment error between a source port and a target port in an optical switch using a feedback loop employing gradient control; and
   in at least one other axis, generating a control input according to a first control law that changes the control input as a function of an error in power or a second control law that changes the control input as a function of an estimate of a power gradient, including transitioning therebetween, based on a state of optical coupling between the source port and the target port in the optical switch to attenuate the optical coupling in a variable manner.

2. The method according to claim 1 wherein the error in power is the difference between desired power and measured nominal power received by the target port.

3. The method according to claim 1 wherein the error in power is based on a relative measure of optical power received by the target port and optical power at the source port.

4. The method according to claim 1 wherein the estimate of a power gradient is an estimate of a power gradient in the at least one other axis.

5. The method according to claim 1 wherein transitioning the control input in the at least one other axis between the first control law and the second control law includes transitioning the control input based on the smaller of a scaled power error and a scaled power gradient.

6. The method according to claim 1 wherein generating the control input in the at least one other axis includes applying a dither signal to the control input.

7. The method according to claim 6 further including varying the amplitude of the dither signal.

8. The method according to claim 6 wherein varying the amplitude of the dither signal is based on an error metric or an estimate of power gradient.

9. The method according to claim 1 wherein generating the control input in the at least one other axis includes transitioning between applying a dither signal and not applying a dither signal to the control input in the at least one other axis.

10. The method according to claim 9 wherein transitioning between applying the dither signal and not applying the dither signal includes using hysteretic criteria.

11. The method according to claim 9 wherein transitioning between applying the dither signal and not applying the dither signal depends on an error metric, estimate of power gradient, or combination of both.

12. An apparatus for controlling optical coupling in an optical switch, the apparatus comprising:
    in at least one axis, a controller configured to employ gradient control using a feedback loop that compensates for alignment error between a source port and a target port in an optical switch; and
    in at least one other axis, the controller configured to generate a control input according to a first control law that changes the control input as a function of an error in power or a second control law that changes the control input as a function of an estimate of a power gradient, including transitioning therebetween, based on a state of optical coupling between the source port and the target port in the optical switch to attenuate the optical coupling in a variable manner.

13. The apparatus according to claim 12 wherein the error in power is the difference between desired power and measured nominal power received by the target port.

14. The apparatus according to claim 12 wherein the error in power is based on a relative measure of optical power received by the target port and optical power at the source port.

15. The apparatus according to claim 12 wherein the estimate of a power gradient is an estimate of a power gradient in the at least one other axis.

16. The apparatus according to claim 12 wherein transitioning the control input in the at least one other axis between the first control law and the second control law includes transitioning the control input is based on the smaller of a scaled power error and a scaled power gradient.

17. The apparatus according to claim 12 wherein the controller is configured to apply a dither signal to the control input in the at least one other axis.

18. The apparatus according to claim 17 wherein the controller is further configured to vary the amplitude of the dither signal.

19. The apparatus according to claim 18 wherein the controller is configured to vary the amplitude of the dither signal based on an error metric or an estimate of gradient of power.

20. The apparatus according to claim 12 wherein the controller is configured to transition between applying a dither signal and not applying a dither signal to the control input in the at least one other axis.

21. The apparatus according to claim 20 wherein the controller is configured to use hysteresis to offset the transition.

22. The apparatus according to claim 20 wherein the controller is configured to transition based on an error metric or an estimate of gradient of power.

23. An apparatus for controlling optical coupling in an optical switch, the apparatus comprising:
    in at least one axis, means for compensating for alignment error between a source port and a target port in an optical switch using a feedback loop employing gradient control; and
    in at least one other axis, means for generating a control input according to a first control law that changes the control input as a function of an error in power or a second control law that changes the control input as a function of an estimate of a power gradient, including transitioning therebetween, based on a state of optical coupling between the source port and the target port in the optical switch to attenuate the optical coupling in a variable manner.

24. A method for controlling optical coupling between a source port and a target port in an optical switch, the method comprising:
    in at least one axis, compensating for alignment error between a source port and a target port in an optical switch using a feedback loop employing gradient control; and
    in at least one other axis, transitioning between applying a dither signal and not applying a dither signal, and further generating a control input according to a first control law or a second control law, including transitioning therebetween, based on a state of optical coupling between the source port and the target port in the optical switch to attenuate the optical coupling in a variable manner.

25. The method according to claim 24 wherein transitioning between applying the dither signal and not applying the dither signal includes using hysteretic criteria.

26. The method according to claim 24 wherein transitioning between applying the dither signal and not applying the dither signal depends on an error metric, estimate of power gradient, or combination of both.

27. The method according to claim 24 wherein generating the control input on the at least one other axis includes transitioning between the first control law that changes the control input as a function of an error in power and the second control law that changes the control input as a function of an estimate of a power gradient.

28. An apparatus for controlling optical coupling in an optical switch, the apparatus comprising:
    in at least one axis, a controller configured to employ gradient control using a feedback loop that compensates for alignment error between a source port and a target port in an optical switch; and
    in at least one other axis, the controller configured to transition between applying a dither signal and not applying a dither signal, and further configured to generate a control input according to a first control law or a second control law, including transitioning therebetween, based on a state of optical coupling between the source port and the target port in the optical switch to attenuate the optical coupling in a variable manner.

29. The apparatus according to claim 8 wherein the controller is configured to use hysteresis to offset the transition.

30. The apparatus according to claim 8 wherein the controller is configured to transition based on an error metric or an estimate of gradient of power.

31. The apparatus of claim 28 wherein the controller is configured to transition between the first control law that changes the control input as a function of an error in power and the second control law that changes the control input as a function of an estimate of a power gradient.

* * * * *

UNITED STATES PATENT AND TRADEMARK OFFICE
CERTIFICATE OF CORRECTION

PATENT NO. : 7,313,295 B2
APPLICATION NO. : 11/063453
DATED : December 25, 2007
INVENTOR(S) : Kamyar Ghandi and Timothy S. Glenn It is certified that error appears in the above-identified patent and that said Letters Patent is hereby corrected as shown below:

<u>Column 12</u>

Line 32, delete "claim 8," and insert --claim 28--;

Line 35, delete "claim 8," and insert --claim 28--.

Signed and Sealed this

Tenth Day of June, 2008

JON W. DUDAS
*Director of the United States Patent and Trademark Office*